United States Patent [19]
Fredlund et al.

[11] Patent Number: 6,154,295
[45] Date of Patent: Nov. 28, 2000

[54] SYSTEM AND METHOD FOR SELECTING PHOTOGRAPHIC IMAGES

[75] Inventors: John Randall Fredlund, Rochester; David Lynn Patton, Webster; Roger R. A. Morton, Penfield; Steven Bruce Paciocco, Lima, all of N.Y.

[73] Assignee: Eastman Kodak Company, Rochester, N.Y.

[21] Appl. No.: 08/510,733

[22] Filed: Aug. 3, 1995

Related U.S. Application Data

[63] Continuation-in-part of application No. 08/201,735, Feb. 25, 1994, abandoned.

[51] Int. Cl.$^7$ .............................. H04N 1/04; H04N 1/46; H04N 1/00
[52] U.S. Cl. ...................... 358/487; 358/506; 358/403
[58] Field of Search ........................... 358/487, 527, 358/506, 508, 402, 434, 500, 407, 440, 403, 442; 355/38, 40, 41; 364/401 R

[56] References Cited

U.S. PATENT DOCUMENTS

| | | | |
|---|---|---|---|
| 4,528,643 | 7/1985 | Freeny, Jr. .............................. | 364/918 |
| 5,101,286 | 3/1992 | Patton ..................................... | 358/487 |
| 5,185,821 | 2/1993 | Yoda ....................................... | 358/403 |
| 5,189,510 | 2/1993 | Henaff et al. ........................... | 358/403 |
| 5,270,839 | 12/1993 | Parulski et al. ......................... | 358/444 |
| 5,307,176 | 4/1994 | Dweck et al. ........................... | 358/403 |
| 5,335,084 | 8/1994 | Manemasa et al. ..................... | 358/403 |
| 5,420,699 | 5/1995 | Yamanouchi et al. .................. | 358/487 |
| 5,448,372 | 9/1995 | Axman et al. .......................... | 358/403 |
| 5,477,353 | 12/1995 | Yamasaki ................................ | 358/487 |

OTHER PUBLICATIONS

Klein, Stanley; Stiefel, Malcolm, "Photo CD: New Business Opportunities for Graphics and Photo Professionals", Computer Pictures, v10, n5, p14(4) Sep.–Oct. 1992.

Primary Examiner—Edward L. Coles
Assistant Examiner—Fan Lee
Attorney, Agent, or Firm—Thomas H. Close

[57] ABSTRACT

A method for remotely selecting and ordering photographic prints, includes the steps of: sending a photographic film bearing a plurality of latent images to a photofinisher; developing the photographic film to produce visible images and scanning the visible images to create a digital image file at the photo finisher; producing an index print having a plurality of images from the photographic film along with an index number associated with each image and an order number; sending the index print to a customer; selecting images for which prints are desired from the index print; ordering photographic prints via telephone from the customer's home to the photofinisher, specifying the order number and the index numbers associated with the images for which prints are desired; and making photographic prints of the selected images at the photofinisher and sending the photographic prints to the customer.

10 Claims, 4 Drawing Sheets

SYSTEM AND METHOD FOR SELECTING PHOTOGRAPHIC IMAGES

This is a continuation-in-part of application Ser. No. 08/201,735 filed Feb. 25, 1994 now abandoned, entitled "System and Method for Selecting Photographic Images" by J. R. Fredlund, D. L. Patton, R. A. Morton and S. B. Paciocco.

TECHNICAL FIELD

The present invention is directed to the field of photo processing and, more particularly, to the selection of photographic images for printing.

BACKGROUND ART

A number of systems have been proposed for electronic processing of prints. These include Kodak's Creat-a-Print, where the operator goes to a photo store or mini lab location, inserts his negatives, and zooms and crops or enlarges the image prior to printing. Other systems, like Kodak's Image Magic, provide for a combination of a stored image with that of a "live" image of the customer, for prints which have been cropped and composed at a theme park. In addition, Photo CD™ provides a method for putting selected images at full 35 mm film resolution on a Photo CD™ disc.

Often, however, a consumer faces a problem in that he has received a number of prints from a photo dealer or in the mail from a photo finisher and he wishes to send additional copies of these prints to other friends or relatives, or receive additional copies for himself.

In traditional photo processing environments, there has always been the difficulty of determining which photographic negative contains the image of choice. The customer often has difficulty determining which photographic negative contains the image of choice. Also, the customer often has difficulty interpreting the negative as it would appear when printed. The customer must identify the images of interest on the negative by identifying each negative to the prints he wants. He must then return the negative to the mini lab, photo store, or photo processor, either in person or by mail, and then must specify the size and number of each print. He must then wait for the new prints to be made and then obtain these prints from the drug store, mini lab, or photo finisher.

There are a number of problems with this approach. For instance, the sensitive film negative must be handled multiple times by the customer, adding a potential for scratching, fingerprinting, and otherwise damaging the film. Also, the sleeve must be written on to convey the ordering information. This works well if the customer does not insert the negatives into the sleeve before writing on it. Otherwise, there is a potential for damaging the film by writing on the sleeve while the film is within. There is also a potential for improper recording of data. Furthermore, the small negative image is not easily identifiable by the customer, particularly when there are several similar images. Another problem is that the images on the film do not always line up well with the preflashed numbers on the edge of the film. The customer is often confused as to whether an image is "number 9", number "9A", or number "10". This confusion car result in selection of the wrong images for reprint.

Recently, in an attempt to facilitate the process of ordering photographic reprints, customers have been supplied with an index print containing a number of miniature images along with an associated index number corresponding to the frame number on the film. Customers return the negatives bearing the images corresponding to the desired reprints to the photofinisher and indicate the desired frame number from the index print for reprints. Although this approach represents an improvement over prior techniques, it still has the drawback of having the customers handle the negatives, which can become soiled, damaged or lost while in the possession of the customer. When a customer does order reprints, the negatives may be stored haphazardly and apart from the original prints, making the negatives difficult to retrieve at a later date. Finally, this somewhat arduous process of obtaining additional prints provides little impetus for reprints. The inconvenience of ordering is a barrier to ordering reprints.

It is seen then that it would be desirable to have an improved system and method for facilitating ordering and re-ordering of prints from negatives or slides.

SUMMARY OF THE INVENTION

The present invention is a system for facilitating ordering of prints from negatives or slides, and enables a customer to select size, destination, text, frames and other options associated with photographic prints. The present invention streamlines the previously inconvenient means of selecting and ordering photographic reprints.

A method for remotely selecting and ordering photographic prints, includes the steps of: sending a photographic film bearing a plurality of latent images to a photofinisher; developing the photographic film to produce visible images and scanning the visible images to create a digital image file at the photo finisher; producing an index print having a plurality of positive images from the photographic film along with an index number associated with each image and an order number; sending the index print to a customer; selecting images for which prints are desired from the index print; ordering photographic prints via telephone from the customer's home to the photofinisher, specifying the order number and the index numbers associated with the images for which prints are desired; and making photographic prints of the selected images at the photofinisher and sending the photographic prints to the customer.

According to the present invention, an index print is created by scanning the customer's negatives or slides before they are returned, and the digital images created from these negatives or slides are stored on a portable hard drive or other storage device, for later retrieval and service orders. The customer may select images and services to be performed using the index print and a touch tone telephone. Alternatively, a computer/voice ordering system could take the reprint/original print order by means of references to the index print.

Accordingly, it is an object of the present invention to provide a system and method for facilitating ordering and re-ordering of prints from negatives or slides. It is a further object of the present invention to enable a photographer to select size, destination, text, frames and other options associated with photographic prints. It is an advantage of the present invention that the previously inconvenient means of selecting and ordering photographic prints and reprints is streamlined.

Other objects and advantages of the invention will be apparent from the following description, the accompanying drawings and the appended claims.

DETAILED DESCRIPTION OF THE PREFERRED EMBODIMENTS

Figure 1:
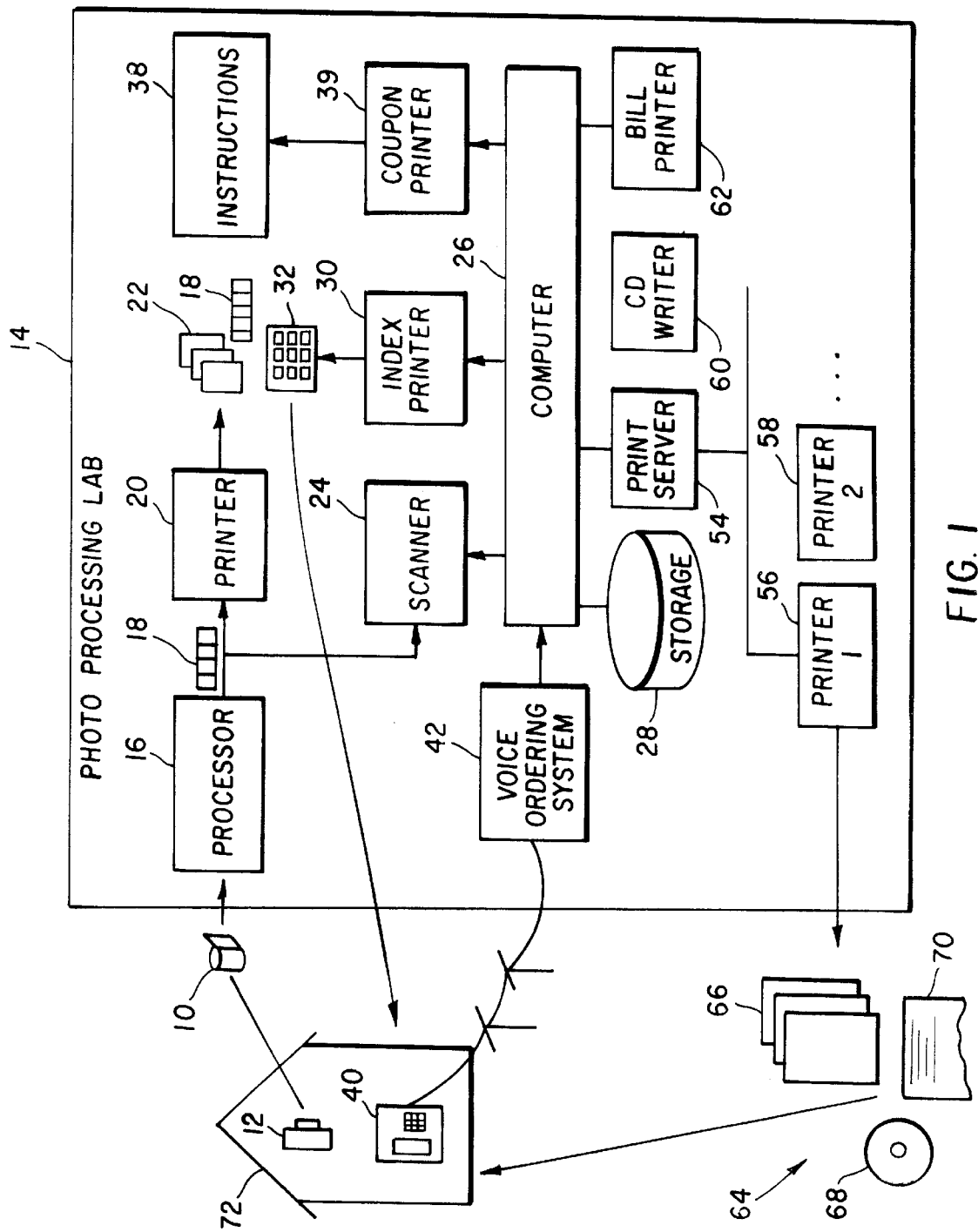
FIG. 1 is a schematic diagram of the system for remotely selecting photographic prints according to the method of the present invention.

Referring to FIG. 1, in one embodiment of the present invention, a customer exposes a roll of film in a cartridge 10 in her camera 12 and sends the film to a photo processing lab 14 to be developed. As is well known, a retail outlet such as a photo store, drugstore, or supermarket may be an intermediary in sending the film to the photoprocessing lab. At the photoprocessing lab 14, the film is developed in a processor 16 to produce processed film 18. The processed film 18 is printed in a photographic printer 20 to produce a set of prints 22. The processed film 18 is also scanned in a scanner 24 to produce a digital image file of the images on the film.

Figure 2:
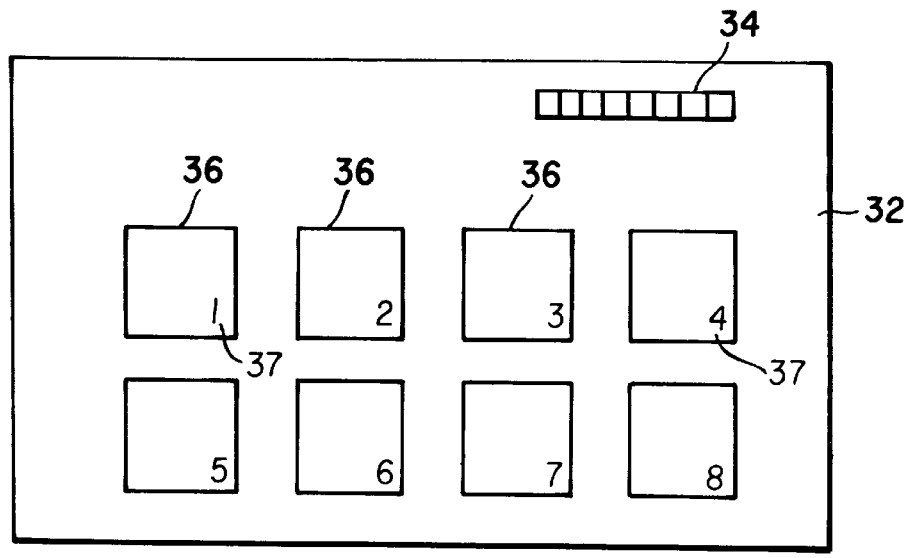
FIG. 2 shows an index print employed in the method of the present invention.

A computer 26 controls the scanner 24, processes the digital image file, and stores the digital image file along with a customer order number and a unique customer identification number in a mass storage device 28 such as a magnetic tape drive or an optical disc. An index printer 30 is connected to the computer 26 and employs the digital image file stored on storage device 28 to produce an index print. The index printer 30 may comprise for example a separate color thermal printer, or a color CRT printer for exposing photographic film. As shown in FIG. 2, the index print 32 includes the customer order number 34 that identifies the digital image file from which the index print was made, and a series of images 36, each having an associated index number 37.

The developed film 18, and prints 22 are returned to the customer along with the index print 32. Instructions 38 may be included with the customer order, informing the customer of the printing and related photographic services available, and the prices for the services. The instructions 38 may be printed out using a coupon printer 39 connected to computer 26. The customer is instructed that a digital record of their negatives was made and that by calling, for example, a 1-800 number, they can either have the digital file of their negatives deleted or extended for a certain period of time, such as a month. The customer can then have a specified period of time to respond by ordering a service. If the customer does not order any service in that period of time, their file is automatically deleted. During the time period, there are several services that they can order, and special price advantages may be offered. If any service is ordered, maintenance of the digital negatives file may be extended.

Figure 3:
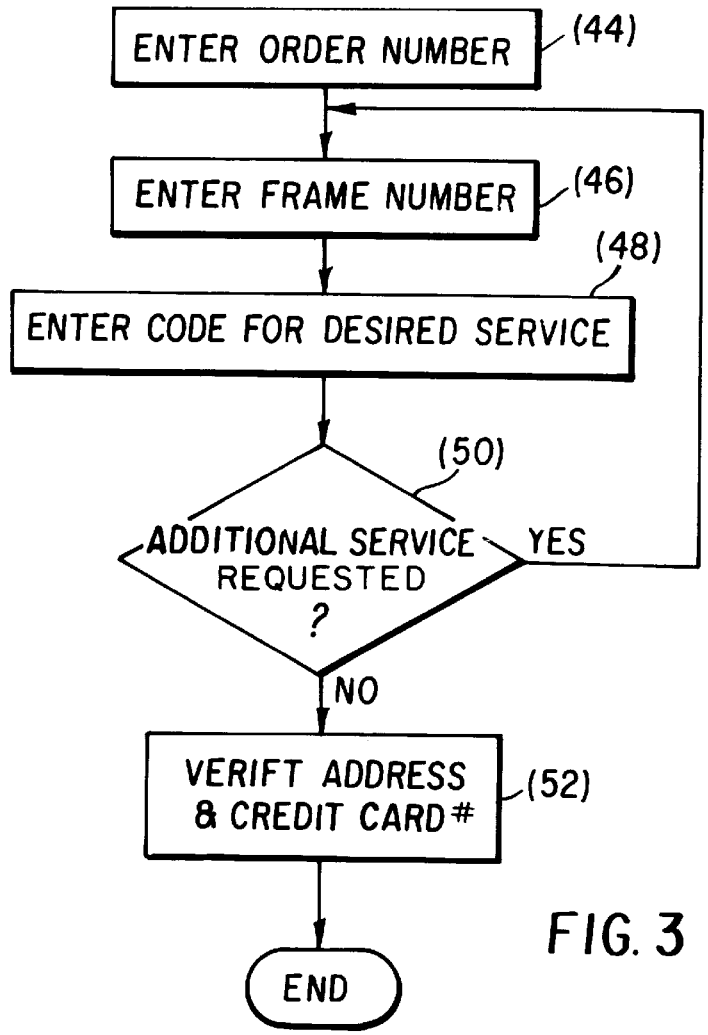
FIG. 3 is a flow chart illustrating the ordering of photographic prints according to the present invention.

The customer calls on her touch tone telephone 40 and connects with an operator or computer voice ordering system 42. As shown in FIG. 3, the voice ordering system instructs the customer to enter the order number (44), and then requests a frame number to be entered (46). Next, the customer is directed to enter a code for the desired service (48) to be performed with respect to the image corresponding to the desired frame number. The customer is queried as to whether additional services are required (50). If the answer is yes, the previous steps are repeated; if no, the address and credit card number of the customer is verified (52), and the order process is ended.

During the ordering process, the customer may be prompted to record a voice message that is recorded and provided with a print related service, such as a voice chip associated with the print, or a magnetic or other type of recording on the print or associated with the print. The voice message may also be transcribed and printed on a label or on the back of the print.

Returning to FIG. 1, computer 26 is connected to a print server 54 that controls a number of digital printers 56, and 58. The digital printers may include, for example, digital printers for exposing conventional silver halide color photographic paper to make high quality enlargements, thermal dye transfer printers and ink jet printers for making poster size enlargements. A Photo CD™ writer 60 is also connected to the computer 26 for recording the customer selected images on a Photo CD™. A bill printer 62 is connected to the computer 26 for printing the customer bill.

After completion, the customer order, generally designated 64, including any photographic prints 66, Photo CD's™ 68 and the customer bill 70 is sent to the customers delivery address 72, either by mail or parcel service.

Services which may be ordered include requesting a Photo CD™ from the digital image file whose images appear on the index print. Digital enlargements may be made from selected digital image files whose images appear on the index print. Digital prints, enlargements, and other image bearing items made from selected digital image files may be sent directly to the customer or to any person designated by the customer. Digital greeting cards or business cards may be made from selected digital negatives. Other products and services such as images inserted in pre-prepared templates, printed album pages, collages, recorded voice messages, etc. can be offered. Additionally, for a nominal fee, the customer can extend the length of time their digital negatives are stored.

Alternatively, the photofinisher may not make any prints originally and can keep the film 18 for use in optical printing later when the customer places his or her order (or a set of prints could be made and sent to the customer while the negatives are retained by the photofinisher). If the customer chooses to maintain the digital file or make a print order, the customer then has that specified period of time to respond by ordering a service. If the customer does not order anything within that time period, their file is automatically deleted. The negatives could be destroyed or returned. During the time period, there are several services that can be ordered, and special prices may apply. Ordering a service may also extend the maintenance of their digital negative files. Services may be ordered using a touch tone telephone and the unique ID number, without requiring additional personnel to take the orders. As images are discarded by the customer, the storage devices can be reused.

Figure 4:
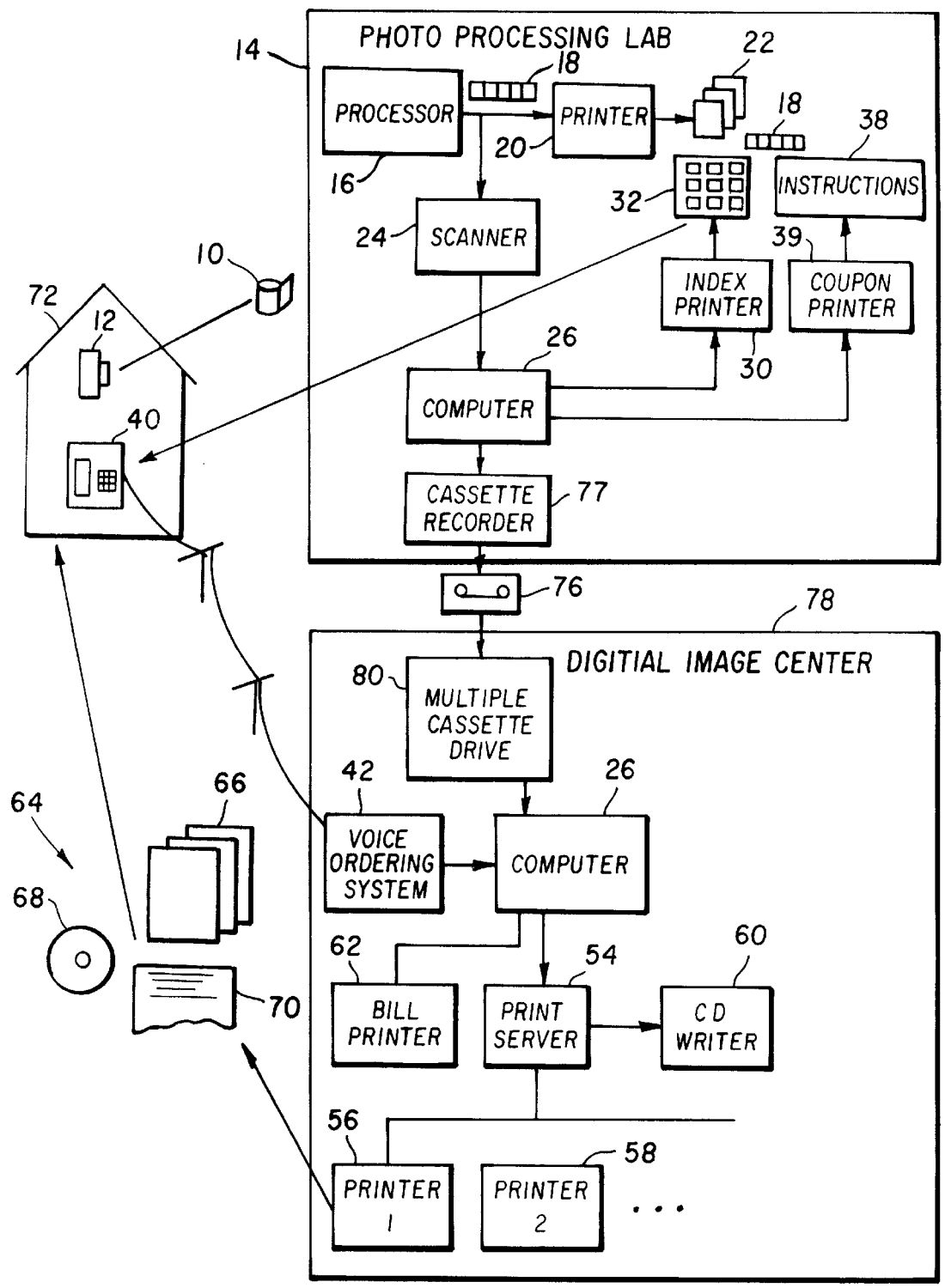
FIG. 4 shows an alternative embodiment of the present invention.

Because the digital printers and digital storage are capital intensive items, it may be preferable to separate the digital printing part of the operation from the photo processing lab and place it in a digital image center that serves several photo processing labs. FIG. 4 illustrates this approach. After the films are scanned at the photo processing lab 14, and the index prints made, the digital image files are stored on magnetic tape cassettes 76 in digital cassette recorder 77. Several orders, such as one day's production may be placed on one cassette. The cassettes 76 are shipped to a digital image center 78, where they are placed in a multiple cassette drive 80 for future access.

Alternatively, the digital image files on the cassettes may be transferred to another storage medium such as optical disc at the digital image center 78. Also, rather than physically shipping a tape cassette 76, the digital image file may be transmitted to the digital image center over a high speed data link such as a fiber optic cable.

Figure 5:
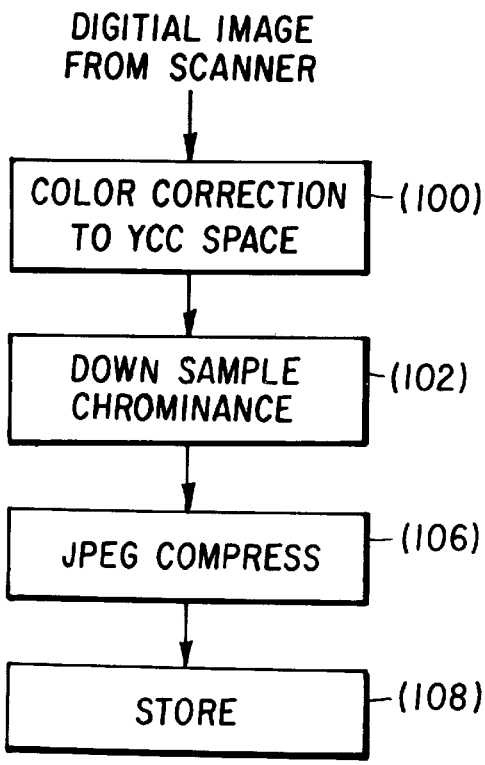
FIG. 5 is a flow chart showing the digital image compression steps used in one embodiment of the present invention.

As shown in FIG. 5, to minimize storage size, the digital image files may be compressed prior to storage. The digital images from scanner 24 are passed as 3-plane, 2K×3K pixel, digitized color images. The digital images are processed (100) to convert the negative film scans from cyan, magenta, and yellow color space to Kodak's YCC color space (a luminance Y, and color difference signal CC color space). Slide film scans are converted from red, green, blue color space to Kodak's YCC color space. The bit-depth of each pixel in a color plane is reduced from 12-bits to 8-bits using a non-linear luminance mapping which more evenly distributes quantization errors based on human perception rather than image intensity.

The high resolution version of the YCC image is now down sampled (102) in each chrominance channel by a factor of 2:1 in each of the x-direction and y-directions in the image. This can generally be done with very little loss of data due to the reduced information content in these channels.

The image is further reduced in storage requirement by performing JPEG image compression (106) on both the low and high resolution images. The compression ratio achieved will depend on the image content and the desired image quality (i.e. the level of acceptable compression induced artifacts in the decompressed image). The compression technique and quantization matrix are selected to enable compression ratios on the order of 5:1 to 15:1 to be achieved.

Alternately, a lower spatial resolution scanner 24 may be used to scan the film image in combination with a compression module which uses smaller compression ratios (e.g. 1.5:1 to 3:1) to achieve a similar compressed storage image file size. The lower scanning data rate advantage of this method is offset by more limited ability to enlarge the resulting stored image without introducing visible image artifacts. The resulting compressed digital image files are stored (108).

Figure 6:
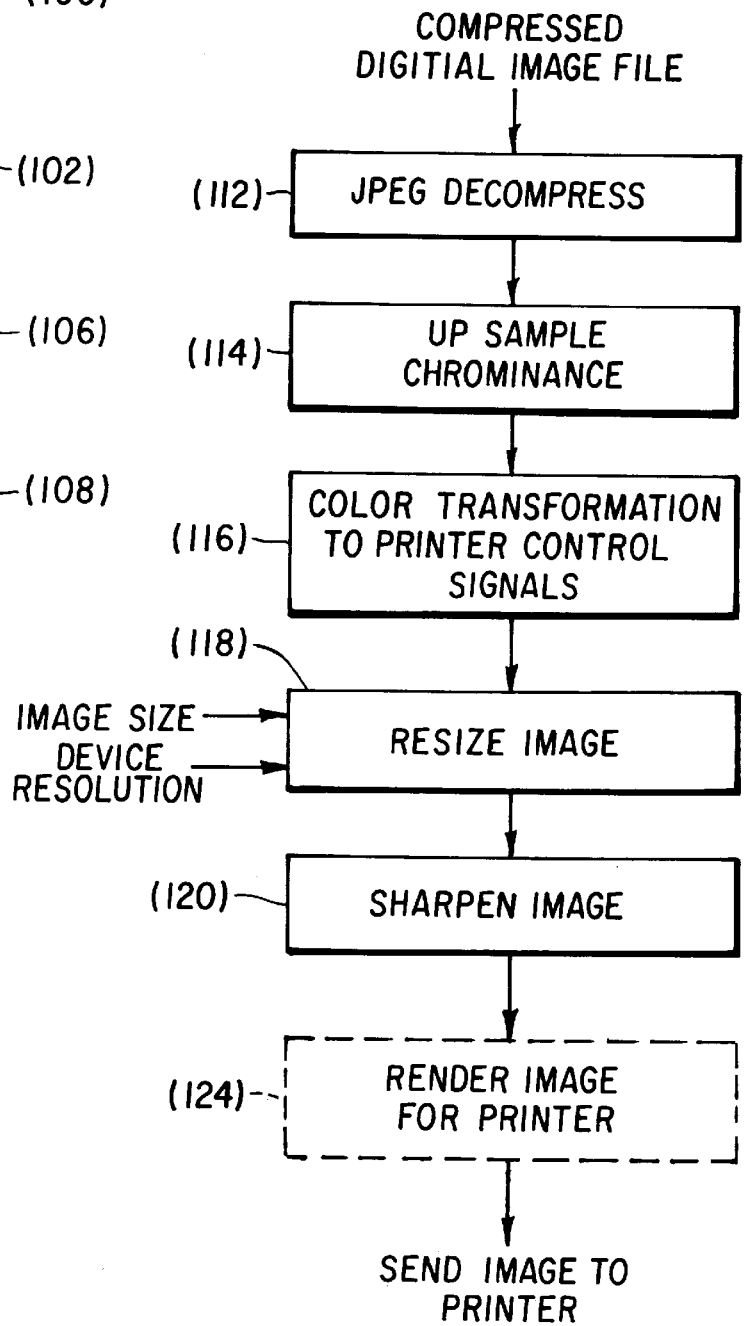
FIG. 6 is a flow chart showing the image decompression steps performed on the compressed digital image.

To decompress the digital image file, the operations performed by the computer 26 in the photo processing lab 14, or computer 80 in the digital image center 78 will now be described with reference to FIG. 6. To utilize the stored compressed image, JPEG decompression is applied (112) to reverse the effects of the JPEG compression step (106). The chrominance channels are then up sampled (114) to reverse the down sampling (102) previously performed on these channels.

Color transformation is performed (116) as necessary to translate the encoded Kodak YCC image color space image into the control signal space necessary to drive the intended printing device.

The image is then resized (118) based on the desired final image size and the image printer's writing resolution (i.e. pixels per inch). The previous two steps are sometimes reversed to eliminate unnecessary pixel computations (e.g. color transformation may be performed after resizing when the resulting image is to be significantly reduced in size to avoid color correcting pixels which would never be printed as a result of a subsequent resizing step).

Image sharpening is generally performed (120) as one of the last steps in the processing chain to compensate for the image printer's natural modulation transfer function (MTF). Alternately, this sharpening step is sometimes performed prior to resizing to save processing time if significant enlargement is requested and the resulting loss of image quality will not be objectionable.

Next, if a device which is not able to reproduce "continuous-tone" color (i.e. 8-bits per pixel per color plane) is used to make this final print, a halftoning step (124) is employed to render the image to the reduced number of bits capable of being printed per pixel per color by the final image printing device (e.g. an inkjet print might be reduced to 1-bit per pixel per color to accommodate this device's bitonal printing capability).

As will be obvious to those skilled in the art, various modifications of the present invention are possible without departing from the scope of the invention. For example, the customer is able to order goods and services via a telephone, by looking at the index print and making selections on the touch tone pad.

Industrial Applicability and Advantages

The present invention is useful in the field of photo processing in that it reduces the inconvenience of ordering prints and reprints from photographic negatives. The present invention has the advantage of streamlining the previously inconvenient means of selecting and ordering photographic prints and reprints. The present invention has the further advantage of decreasing the multiple handling of sensitive film negatives by the customer. The present invention offers the potential for eliminating unwanted prints by allowing the customer to peruse the images before ordering an initial printing of the negative. The present invention also has the advantage of eliminating improper recording of data. Finally, the present invention has the advantage of making negative images more easily identifiable by the customer, particularly when there are several similar images.

Having described the invention in detail and by reference to the preferred embodiment thereof, it will be apparent that other modifications and variations are possible without departing from the scope of the invention defined in the appended claims.

Parts List

10 film cartridge
    12 camera
    14 photo processing lab
    16 film processor
    18 processed film
    20 photographic printer
    22 photographic prints
    24 film scanner
    26 computer
    28 storage device
    30 index printer
    32 index print
    34 customer order number
    36 index images
    37 index number
    38 instructions
    40 telephone
    42 voice ordering system
    44 enter order number step
    46 enter frame number step
    48 enter code for desired service step
    50 identify additional services step
    52 verify customer credit information step 54 print server
56 digital printer
58 digital printer
60 Photo CD writer
62 bill printer
64 customer order
66 photographic prints
68 Photo CD
70 customer bill
72 customer delivery address
76 magnetic tape cassette
77 cassette recorder
78 digital image center
80 multiple cassette drive
100 image processing step
102 down sample step
106 JPEG compress step
108 store digital image step
112 JPEG decompress step
114 chrominance up sample step
116 color transformation step
118 resize image step
120 sharpen image step
124 halftone image step

What is claimed is:

1. A method for remotely selecting and ordering photographic prints, comprising the steps of:

a) sending a photographic film bearing a plurality of latent images to a photofinisher;
   b) developing the photographic film to produce visible images and scanning the visible images to create a digital image file at the photo finisher;
   c) producing an index print having a plurality of images from the photographic film along with an index number associated with each image and an order number;
   d) sending the index print to a customer;
   e) selecting images for which prints are desired from the index print;
   f) ordering photographic prints via telephone from the customer's location, specifying the order number and the index numbers associated with the images for which prints are desired;
   g) making photographic prints of the selected images at the photofinisher and sending the photographic prints to the customer; and
   h) deleting the digital image file if no order for prints is made within a predetermined time.

2. The method for remotely selecting and ordering photographic prints claimed in claim 1, wherein the developed film is returned to the customer along with the index print and the photographic prints are made from the digital image file.

3. The method for remotely selecting and ordering photographic prints claimed in claim 2, wherein the digital image file is transferred to and stored at a digital image center remote from the location where the film was developed and scanned, where the photographic prints are made by a digital printer.

4. The method for remotely selecting and ordering photographic prints claimed in claim 3, wherein the digital image file is compressed prior to storage.

5. The method for remotely selecting and ordering photographic prints claimed in claim 4, wherein the compression comprises the steps of:

a. converting the digital image to YCC color space;
   b. down sampling the chroma (CC); and
   c. performing JPEG compression on the Y and down sampled CC components of the converted digital image signal.

6. The method for remotely selecting and ordering photographic prints claimed in claim 1, further comprising providing other image related services selected from the group of greeting cards, business cards, image bearing articles, printed album pages, collages, a Photo CD™ along with the photographic prints.

7. The method for remotely selecting and ordering photographic prints claimed in claim 1, wherein the orders are taken by a computer/voice ordering system.

8. The method for remotely selecting and ordering photographic prints claimed in claim 1, further comprising the steps of:

a. recording a voice message from the customer; and
   b. providing other image related services employing the recorded voice message.

9. The method for remotely selecting and ordering photographic prints claimed in claim 8, wherein the other image related services include adding sound to prints.

10. The method for remotely selecting and ordering photographic prints claimed in claim 8, wherein the other image related services include transcribing the voice message and backprinting the message on the prints or on a label.

* * * * *